Nov. 22, 1927.

H. B. DONLEY 1,650,501

VEHICLE HEADLAMP

Filed Feb. 17, 1926

2 Sheets-Sheet 1

Inventor
H. B. Donley
By N. D. McDowell.
Attorney

Nov. 22, 1927.	H. B. DONLEY	1,650,501
VEHICLE HEADLAMP
Filed Feb. 17, 1926	2 Sheets-Sheet 2

Inventor
H. B. Donley
By N. D. McDowell
Attorney

Patented Nov. 22, 1927.

1,650,501

UNITED STATES PATENT OFFICE.

HAROLD B. DONLEY, OF COLUMBUS, OHIO, ASSIGNOR TO THE JOHN W. BROWN MANUFACTURING COMPANY, OF COLUMBUS, OHIO, A CORPORATION OF OHIO.

VEHICLE HEAD LAMP.

Application filed February 17, 1926. Serial No. 88,899.

This invention relates to improvements in motor vehicle head lamps, and is especially directed to head lamps of the type employing gas burners as light sources or, in other words lamps using acetylene gas to create a light source rather than electrically energized incandescent filaments.

It is the principal object of the present invention to provide a vehicle head lamp of the gas burner type with an improved combined supporting bracket and ventilating hood, by means of which the lamp body may be securely and stationarily supported in an operative position upon the frame of a motor vehicle and at the same time to provide a means for permitting of the circulation of air through the body of the lamp so as to promote combustion and yet to form said bracket so that the inlet of air would be accomplished in a gradual, slow flowing manner devoid of high velocity currents which would have a tendency to interfere with the gas combustion taking place at the burner.

Another object of the invention rests in providing a lamp of the above character with a plurality of ventilating openings in the bottom thereof at points adjacent to a gas burner, and in extending the lamp supporting bracket to provide hoods or extensions which covers said openings so as to provide for a control and regulated inflow of air into and through the body of the lamp.

With these and other objects in view, as will appear as the description proceeds, the invention consists in the novel features of construction, combinations of elements and arrangements of parts hereinafter to be fully described and pointed out in the appended claim.

Figure 1:
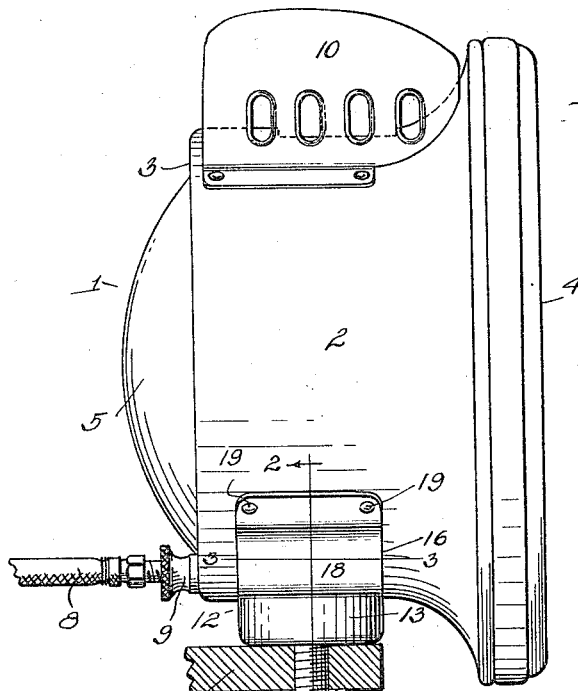
Figure 2:
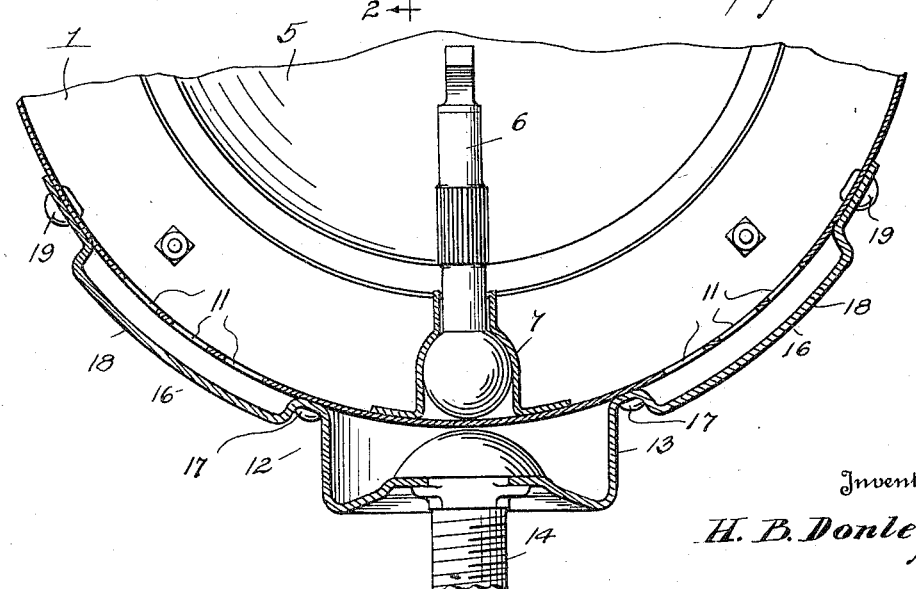
Figure 3:
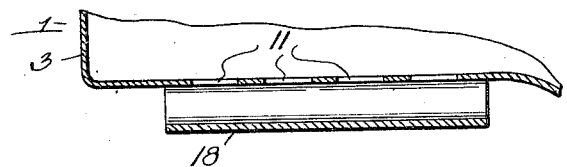
Figure 4:
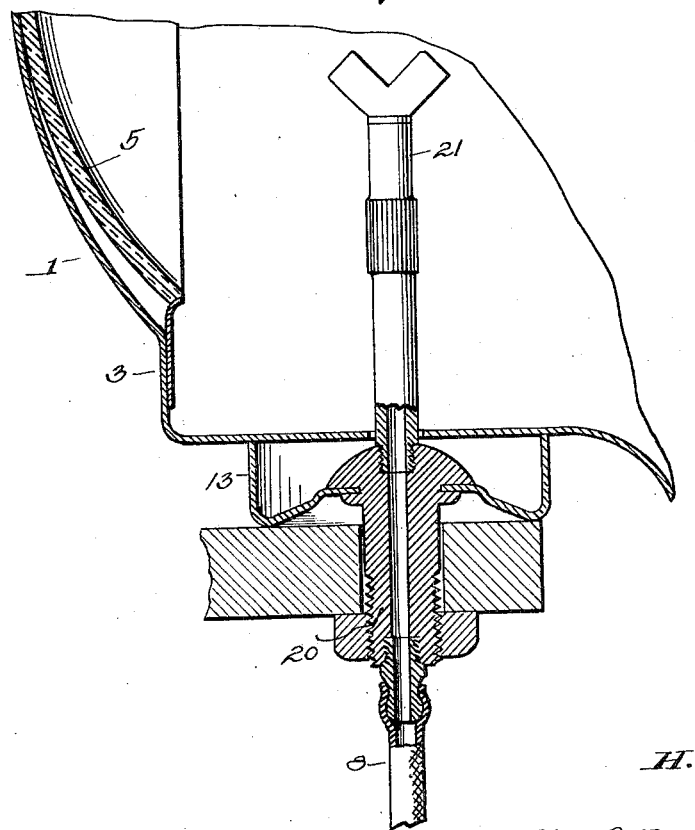

In the accompanying drawing:

Figure 1 is a side elevation of a motor vehicle head lamp constructed in accordance with the present invention, Figure 2 is a vertical longitudinal sectional view taken on the plane indicated by the line 2—2 of Figure 1, Figure 3 is a transverse cross-sectional view on the line 3—3 of Figure 1, and Figure 4 is a sectional view disclosing a slightly modified form of the invention.

Referring more particularly to the drawings the numeral 1 designates the metallic casing or body of a vehicle head lamp, the same being formed to comprise the usual annular side wall 2, a back wall 3 and an open front which is closed normally by the customary lens ring 4 and its associated lens. The back wall has connected therewith a forwardly facing concave reflector 5 before which is positioned a burner 6 of the type adapted for the burning especially of acetelyne gas. The burner is supported from the bottom of the wall 2 and is maintained in an upright position by guide brackets 7. Gas may be introduced into the burner by a hose or tube 8 extending from any suitable source, and in the form of the invention disclosed in Figures 1 to 3, the burner is adjustable longitudinally by means of the screw 9 located exteriorly of the casing. The top of the casing is provided with a ventilated hood 10, permitting of the escape of heated gases from the lamp, as is customary.

The wall 2 on opposite sides of the burner 6 and the lower part of the lamp is provided with a plurality of ventilating openings 11 to allow air to enter the lamp from the bottom of the latter and to supply the burner with necessary oxygen to promote combustion. The present invention consists in providing a lamp of this character with a fixed supporting bracket designated in its entirety by the numeral 12. This bracket consists of a sheet metal stamping formed to provide a cylindrical portion 13, arranged immediately beneath the body 1 in depending relation with respect thereto and provided with a centrally disposed opening for the accommodation of the shank 14 of a securing bolt, used in connecting the lamp with the frame 15 of a vehicle upon which the lamp is mounted, the headed upper end of the bolt being received within the confines of the tubular portion 13 of the bracket. Further, the bracket is formed to provide an integral arcuate wall 16, which is riveted or otherwise secured to the wall 2 as at 17 so as to unite the body of the lamp in connection with said bracket. As shown, the wall 16 is bent outwardly to produce hoods or baffles 18, which pass over and are spaced from the openings 11 in the casing of the lamp, and the outer ends of the wall 16, after forming the hoods or baffles 18, are then bent inwardly to again engage the wall 2 and are riveted or otherwise fastened to the latter as at 19.

By this construction it will be seen that there is provided in connection with a gas burning motor vehicle lamp a supporting structure which includes a means admitting of the secure fastening of a lamp casing in connection with the frame of a vehicle and at the same time is formed to control the inlet of air into the interior of the lamp. This latter feature is accomplished chiefly by the inclusion of the baffles 18, integrally formed with the bracket 12, as it is obvious that the arrangement of this bracket is such as to cover the openings 11 so as to prevent the sudden inrush of air into the interior of the lamp. This construction provides for a uniform and even rate of combustion by which a steady and unflickering light is produced, as well as a lamp support of marked mechanical strength.

In the form of the invention disclosed in Figure 4 the fastening screw 20 is of hollow form and is in direct communication with the burner 21, in order that the gaseous fuel may pass through the screw 20 and be delivered to the burner for combustion purposes.

What is claimed is:

In a vehicle head lamp, a casing, a gas burner mounted within said casing, said casing being provided with ventilating openings in the bottom thereof, a supporting bracket secured to the under side of said casing and provided with integral hoods arranged to cover said openings, and a fastening member depending axially from said bracket and provided with a gas conveying passage leading to said burner.

In testimony whereof I affix my signature.

HAROLD B. DONLEY.